United States Patent

Wolf et al.

[11] 3,891,718
[45] June 24, 1975

[54] SHAPED ARTICLES MADE OF ACRYLONITRILE POLYMERS CONTAINING ANTISTATIC ADDITIVES

[75] Inventors: Gerhard Dieter Wolf, Dormagen; Francis Bentz, Cologne; Gunther Nischk, Dormagen, all of Germany

[73] Assignee: Bayer Aktiengesellschaft, Leverkusen-Bayerwerk, Germany

[22] Filed: July 5, 1974

[21] Appl. No.: 486,186

[30] Foreign Application Priority Data
July 7, 1973 Germany.......................... 2334602

[52] U.S. Cl....260/859 R; 260/77.5 CR; 260/88.5 R; 260/88.5 S; 260/88.5 N; 260/88.7 R; 260/88.7 B; 260/88.7 R; 260/DIG. 19

[51] Int. Cl............................................ C08g 41/04
[58] Field of Search................ 260/859 R, 85.5 R, 5

[56] References Cited
UNITED STATES PATENTS

| | | | |
|---|---|---|---|
| 2,850,424 | 9/1958 | Finelli | 260/859 R |
| 3,380,953 | 4/1968 | Fukushima | 260/859 R |
| 3,646,178 | 2/1972 | Traubel | 260/859 R |
| 3,852,255 | 12/1974 | Bentz | 260/88.7 R |

FOREIGN PATENTS OR APPLICATIONS
45-2771  1/1970  Japan
45-2772  1/1970  Japan

*Primary Examiner*—Paul Lieberman
*Attorney, Agent, or Firm*—Plumley & Tyner

[57] ABSTRACT

The invention relates to shaped articles of acrylonitrile polymers containing an antistatic additives polyether polyurethane compounds of the general formula

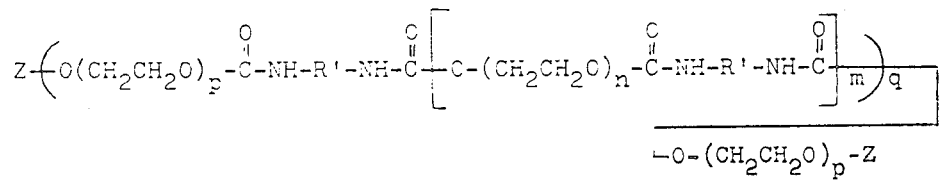

5 Claims, No Drawings

SHAPED ARTICLES MADE OF ACRYLONITRILE POLYMERS CONTAINING ANTISTATIC ADDITIVES

This invention relates to shaped articles of acrylonitrile polymers such as threads, fibres and foils which have permanent antistatic properties.

Shaped articles made of synthetic polymers, e.g., of polyacrylonitrile fibres, generally have the disadvantageous property of becoming electrically charged, with the result that the possibilities of using them are restricted. Such electric charging occurs when the surface resistance of the fibres is more than $10^{12}$ Ohm.

Attempts have been made to reduce the electrostatic charge, for example by surface treating the fibre or the textile products produced from them with antistatic preparations which increase the electric conductivity, but the antistatic effect obtained in this way is only slight and in most cases is not even resistant to washing.

According to another process, an antistatic finish is obtained by applying aqueous solutions of suitable substances to fibres which are in the aquagel state (see German Offenlegungsschrift Nos. 1,469,913 and 1,965,631). In this process, however, it is difficult to maintain the special operating conditions required.

It is also known to mix polyacrylonitrile with, for example, a second acrylonitrile polymer which contains 30 to 80% by weight of a polyethylene oxide methacrylate and then to spin this mixture (German Offenlegungsschrift No. 1,645,532).

Methods which consist of increasing the electric conductivity by copolymerising the polymers with suitable comonomers have the disadvantage that the characteristic advantageous properties of the polymers are often severely modified.

Another frequently empolyed method of reducing the static charge on shaped products of synthetic polymers consists of adding polyethers of other suitable compounds to the solution or melts of these polymers before they are shaped, but it is very difficult to find compounds of this kind which will be both wash resistant, i.e. which will be not be washed out e.g. from fibres of such polymers even by repeated washing with alkaline detergents, and will be compatible with the polymers. When part of the compounds added are removed by washing, socalled vacuoles are formed and the fibres are then no longer glossy but matt on account of this "Soil Hyding Effect."

Polyethers and many compounds which contain polyether segments have the additional disadvantage of lowering the lightfastness of polymers to which they are added.

It has now surprisingly been found that compounds which contain both polyether structures and urethane groups impart a wash resistant and therefore permanent antistatic finish to fibres made of acrylonitrile polymers without reducing their lightfastness. This is all the more surprising since it is known that urethane groups are not very resistant to hydrolysis if they are adjacent to a polyether group.

Therefore it is an object of this invention to provide antistatically finished shaped products made of acrylonitrile polymers.

It is another object to provide antistatically finished shaped products made of acrylonitrile polymers, whereby the disadvantages and difficulties described above can be avoided.

Further objects will be evident from the following description and the examples.

These objects are accomplished by shaped articles of an acrylonitrile polymer containing, as an antistatic additive from 0.5 to 15 % by weight, based on the total mixture, of at least one polyether polyurethane compound of the general formula

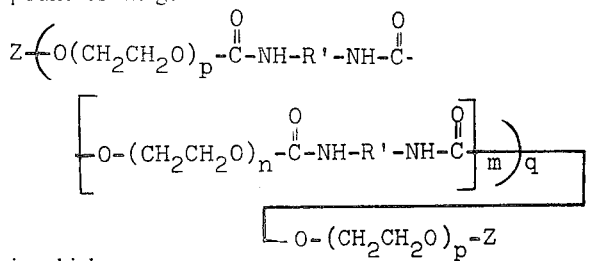

in which
Z represents the radical

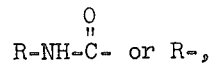

R denotes a $C_{1-18}$-alkyl, cycloalkyl, aralkyl or alkaryl radical, said radical being substituted by halogen or alkyl, or not;
R' represents an alkylene, cycloalkylene, arylene, aralkylene or alkarylene radical said radical being substituted by halogen or alkyl or not;
p and n represent integers of from 5 to 50 being identical

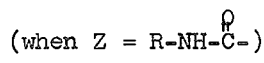

or different (when Z = R),
m represents an integer of from 0 to 10 when Z represents the group

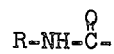

or an integer of from 1 to 10 when Z denotes R;
q represents the integer 1 when Z denotes R or an integer of from 0 or 1 when Z denotes the group

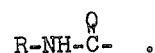

The shaped articles according to the invention are obtained by adding 0.5 to 15% by weight (based on the polymer mixture) of one or more polyether polyurethane compounds of the above formula to solutions of the acrylonitrile polymers and then removing the solvent while shaping the product.

By shaped articles or products are meant mainly filaments, fibres and foils.

The polyetherpolyurethane compounds are preferably added in quantities of 2 to 10 % by weight, based on the polymer mixture.

The urethane group-containing polyethers of this invention combine several advantages, namely in addition to their excellent compatability with polymers they impart an excellent permanent antistatic finish to polyacrylonitrile fibres containing them; in addition, they do not give rise to the vacuoles normally formed by additives and they are not observed to cause any yellowing of the fibres.

The acrylonitrile polymers to be treated in this way are mainly polyacrylonitrile or copolymers of acrylonitrile with (meth)acrylic acid esters, like for example (meth)acrylic acid methyl ester and (meth)acrylic acid ethyl ester, (meth) acrylamides, like for example (meth) acryl amide and N,N-dimethyl(meth)acrylic amide, N-vinyl-lactams, like for example N-vinyl pyrrolidone, vinyl or (meth)allylesters or ethers, vinyl or vinylidene halides, like for example vinyl(iden)chloride and vinyl(iden)bromide, alkylvinylpyridines, vinyl imidazoles, mono- or di-alkylaminoalkyl(meth)acrylates, like for example dimethyl amino ethyl (meth)acrylate or their quaternized derivatives, vinyl or (meth)allylsulphonic acids or vinyl or (meth)allylphosphonic acids or their esters, etc., all of which compounds should contain at least 60% by weight of acrylonitrile in a copolymerised form.

The polyether polyurethane compounds of the formula indicated above in which

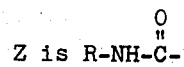

are prepared by known methods as follows: Polyetherdiols with molecular weights of between 200 and 10,000 are reacted together with a less than equivalent amount of a diisocyanate, optionally in the presence of an inert solvent (for example dimethylformamide) but preferably without solvent at temperatures of between 20°C and 150°C, preferably between 80°C and 130°C, to form urethane groups. These polyether polyurethane precondensates which contain hydroxyl end groups are then reacted with a monoisocyanate in a molar ratio of 1 : 2, preferably after first determining the OH number; this reaction also is preferably carried out without solvent and at temperatures of up to 150°C. The reaction time is in each case between 1 and 6 hours.

The polyether polyurethane of the above formula in which

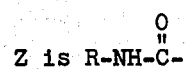

when $q = 0$ are obtained by reacting polyether diols which have molecular weights of between 200 and 10,000 with a monoisocyanate in a molar ratio of 1 : 2, preferably without solvent and at temperatures of between 100°C and 150°C.

Polyether polyurethanes of the above formula in which $Z = R$ are prepared in a very similar manner as follows: A polyether polyurethane precondensate containing two isocyanate end groups is first prepared by reacting a polyether diol with an excess of a diisocyanate under the same reaction conditions as described above. This precondensate is then reacted in a second stage with a polyethoxylated alcohol in a molar ratio of 1 : 2.

Preparation of these polyetherpolyurethanes may advantageously be carried out in a single stage by introducing the polyetherdiol and polyethoxylated alcohol in dimethylformamide into a reaction vessel and then adding the isocyanate in equivalent quantities (based on the total quantity of OH groups) and leaving the mixture to react for several hours (2 to 8 hours) at 120° to 150°C.

The chain length to the precondensates and hence also of the polyether polyurethanes depends mainly on two factors:

a. the molecular weight of the polyether diol used and b. the molar ratio in which the polyetherdiols and diisocyanates are reacted with each other.

The polyether polyurethane compounds vary in consistency from waxy to solid and are in all cases soluble in dimethylformamide.

The diisocyanates used for preparing these polyether polyurethanes are preferably cyclohexane-1,4-diisocyanate, 1-isocyanatomethyl-5-isocyanato-1,3,3-trimethyl-cyclohexane, 1,3-phenylenediisocyanate, 1,4-phenylenediisocyanate, tolylene-2,4-diisocyanate, tolylene-2,5-diisocyanate, 1,5-naphthylenediisocyanate, diphenylmethane-4,4'-diisocyanate, 2,2-bis-(4-isocyanatophenyl)-propane and mixtures thereof, although numerous other diisocyanates may also be used.

Any monoisocyanates can in principle be used but it has been found particularly advantageous to use long chain aliphatic or cycloaliphatic isocyanates such as stearylisocyanates and cyclohexylisocyanate; aromatic isocyanates such as phenyl or naphthylisocyanate are also suitable.

There is in principle no limit to the degree of ethoxylation of the polyether diols used, although for the purpose of this invention it is preferred to use polyether diols with a molecular weight of 400, a molecular weight of 1000 or a molecular weight of approximately 2000.

The polyether polyurethanes are added to the spinning solution of acrylonitrile polymer either in the solid form or as solutions in dimethylformamide and in quantities of 0.5 to 15 % by weight, preferably 2 to 10 % by weight, based on the polymer mixture. If the additives have been prepared in dimethylformamide, for example, then the resulting solution of additives may be added directly to the spinning solution in the required quantity.

The surface electrical resistance of the shaped articles according to the invention, in particular the fibres as indicated in the examples, was determined by means of a commercial high resistance ohmmeter between the plates of two electrodes placed apart at a distance of 1 cm with a measuring voltage of 100 volt between them in accordance with proposed standard DIN 54 345. Before each determination, the fibre material was conditioned to a standard atmosphere of 50 % relative humidity at 23°C for 72 hours. Under these conditions, the fibres produced according to the invention have an electric surface resistance of between $5 \cdot 10^9$ and $10^{11}$ Ohm.

The fibres according to the invention can be dyed with the usual dyes without thereby losing any of their excellent antielectrostatic character. The fibres are particularly suitable for use where subsequent antistatic treatment would otherwise be necessary, for example in curtain material. When used for this purpose, the materials are found not to attract dust due to static electricity of friction and nor is the dust held to the material by sticky preparations.

The following examples are to further illustrate the invention without limiting it:

EXAMPLE 1

Preparation and antistatic action of

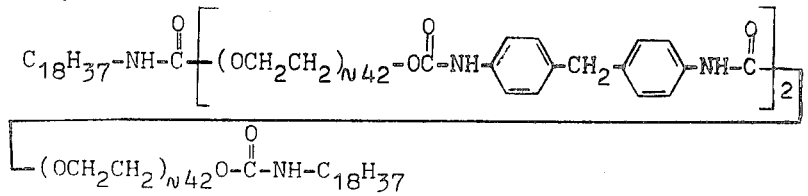

11.9 Parts by weight of 4,4'-diisocyanatodiphenylmethane are added in portions to 133.8 parts by weight of a polyglycol with a average molecular weight of 1870 at about 100°C. 14.1 Parts by weight of stearylisocyanate were slowly added dropwise after 4 hours' stirring at 100 to 130°C. The mixture was then stirred again at 130°C and finally a 25 % solution was prepared by adding 479 parts by weight of dimethylformamide.

This solution of the resulting polyether polyurethane was used together with an acrylonitrile copolymer to prepare a 29 % dimethylformamide solution containing 90 % by weight of the copolymer and 10 % by weight of the polyether polyurethane. The acrylonitrile copolymer used both in this and in subsequent examples was a copolymer of 93 % of acrylonitrile, 6 % of methylacrylate and approximately 1 % of methallysulphonate, which had a K-value of 81 (according to Fikentscher). The solution had a viscosity of approximately 260 poises (85%C) and was converted into threads by dry spinning. Titre of the fibres: 3.3 dtex. The fibres had a strength of 3.2 g/dtex and an elongation of 12 %. The antielectrostatic action of the additive was determined by measuring the surface resistance of the fibres at 23°C and 50 % relative humidity as already indicated above. Fresh sample (undyed) $1 \cdot 10^{10}\Omega$; sample after 10 washes: $2 \cdot 10^{10}\Omega$.

Since the polyacrylonitrile contained an acid additive the fribres could be dyed with the basic dye Astrazon Red GTL (C.I. Basic red, 18, 110 85) by the usual method for acrylic fibres. The surface resistance was then again determined and found to be $3 \cdot 10^{10}\Omega$. This shows that dyeing does not impair the antistatic effect. The surface resistance was still found to be $3 \cdot 10^{10}\Omega$ even after the dyed fibres had been washed several times.

EXAMPLE 2

Preparation and antistatic action of

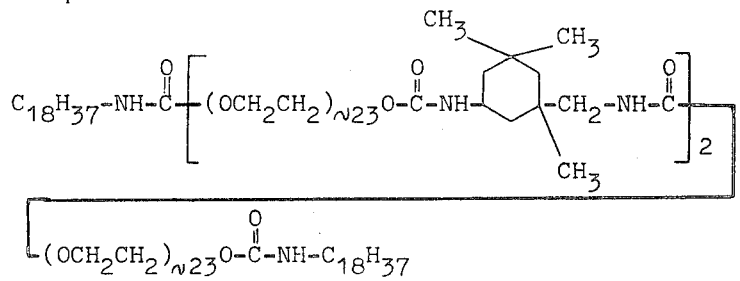

33 Parts by weight of 1-isocyanatomethyl-5-isocyanato-1,3,3-trimethylcyclohexane were slowly added dropwise to 223 parts by weight of a polyglycol with an average molecular weight of MW = 1000 at 80° - 100°C. 44 Parts by weight of stearylisocyanate were added dropwise after 4 hours stirring at 120° to 130°C and the mixture was then stirred again for 4 hours at 130°C.

This polyether polyurethane and the acrylonitrile copolymer mentioned in Example 1 were used to prepare a 29 % solution in dimethylformamide which contained 90 % by weight of polyacrylonitrile and 10 % by weight of the polyether polyurethane. Fibres spun from this solution had a good surface conductivity sufficient for practical purposes. Surface resistance $9 \cdot 10^9\Omega$; after 10 washes: $2 \cdot 10^{10}\Omega$.

EXAMPLE 3

A solution of the acrylonitrile copolymer mentioned in Example 1 in DMF which contained 7% by weight (based on the total solids content) of the polyether polyurethane described in Example 2 was spun to form threads. Titre 3.3 dtex, strength 3.5 g/dtex at 15% elongation. The following results were obtained from measuring the surface resistance: Fresh fibre: $3 \cdot 10^{10}\Omega$; after 10 washes: $6 \cdot 10^{10}\Omega$.

EXAMPLE 4

Preparation and antistatic action of

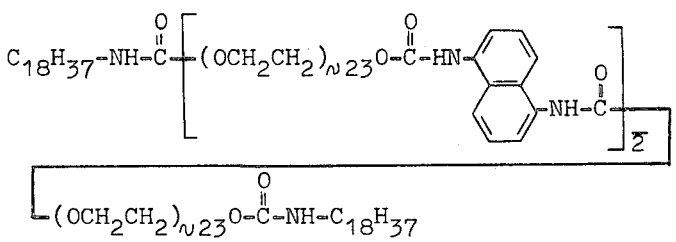

31.5 Parts by weight of naphthylene-1,5-diisocyanate were added in several portions to a solution of 224 parts by weight of polyglycol (MW = 1000) in 300 parts by weight of DMF at about 100°C. The reaction mixture was then stirred for 6 hours at 120 to 130°C. 44.5 Parts by weight of stearyl isocyanate were then introduced dropwise and the reaction mixture again stirred at 120° to 130°C for 8 hours.

Fibres spun from an approximately 25% solution of a mixture of 90% by weight of the acrylonitrile copolymer from Example 1 and 10 % by weight of the compound indicated above had a good surface conductivity. Surface conductivity of fresh fibre: $2 \cdot 10^{10}\Omega$; after 10 washes: $4 \cdot 10^{10}\Omega$.

EXAMPLE 5

Preparation and antistatic action of

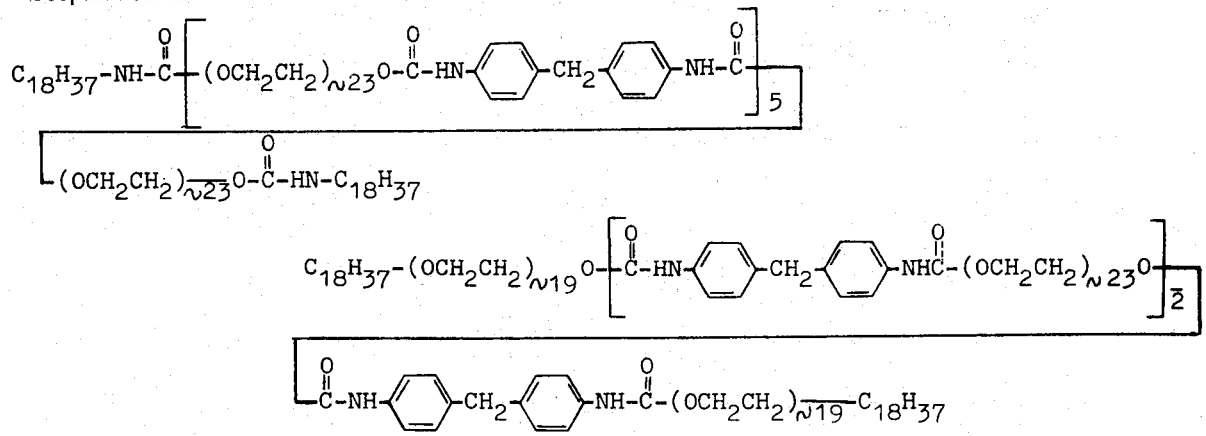

25.5 Parts by weight of 4,4'-diisocyanatodiphenylmethane were added to 122.3 parts by weight of a polyglycol (MW = 1000) at about 100°C. After 4 hours' stirring, 12 parts by weight of stearyl isocyanate were slowly added and the reaction mixture then kept at a temperature of between 100°C and 120°C for a further 4 hours. Fibres spun from an approximately 25 % solution of a mixture of 90 % by weight of the acrylonitrile copolymer from Example 1 and 10 % by weight of the polyether polyurethane described above had very good antistatic characteristics. Surface resistance: $4 \cdot 10^9 \Omega$; after 10 washes: $6 \cdot 10^9 \Omega$. After these fibres had been dyed with the basic dye Astrazon Red GTL, they were found to have a surface resistance of $7 \cdot 10^9$ which was not reduced by subsequent washings.

EXAMPLE 6

A 29 % solution in DMF was prepared from 5 % by weight of the polyether polyurethane described in Example 5 and 95 % by weight of the acrylonitrile copolymer from Example 1. Threads spun from this solution had a surface resistance of $4 \cdot 10^{10}\Omega$ (fresh fibres) and $6 \cdot 10^{10}\Omega$ (after 10 washes).

EXAMPLE 7

Preparation and antistatic action of

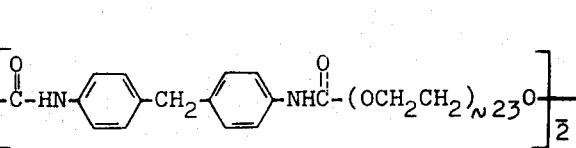

81 Parts by weight of a polyglycol having a molecular weight of 1000 and 88.6 parts by weight of an ethoxylated stearyl alcohol having an average molecular weight of 1095 were dissolved in about 300 parts by weight of dimethylformamide, and 30.4 parts by weight of 4,4'-diisocyanatodiphe-nylmethane were then added in portions to this solution at 120°C. The solution was then stirred at 120° to 130°C for 6 hours.

Fibres spun from an approximately 25 % solution of aa mixture of 90 % by weight of the acrylonitrile copolymer from Example 1 and 10 % by weight of the compound indicated above had a good surface conductivity. Surface resistance of fresh fibres: $1 \cdot 10^{10}\Omega$; after 10 washes: $4 \cdot 10^{10}\Omega$.

EXAMPLES 8 – 18

As described in the preceding Examples, polyethylene glycols were reacted in certain proportions with 4,4'-diisocyanatodiphenylmethane and subsequently with stearyl isocyanate to produce polyether polyurethanes which can be represented by the general equation shown below. Their antistatic action in threads made of polyacrylonitrile polymers is summarized in the Table.

TABLE 1

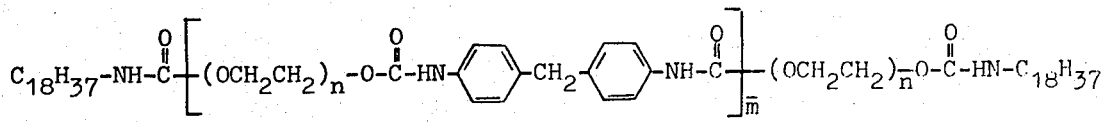

| Examples | $\overline{m}$ | $\overline{n}$ | Quantity of additive in % by weight | Surface resistance in Ω | | |
|---|---|---|---|---|---|---|
| | | | | fresh fibres | after 10 washes | after dyeing and 10 washes |
| 8 | 2 | 9 | 10 | $4 \cdot 10^{10}$ | $5 \cdot 10^{10}$ | — |
| 9 | 2 | 23 | 10 | $9 \cdot 10^9$ | $9 \cdot 10^9$ | $1 \cdot 10^{10}$ |
| 10 | 3 | 23 | 10 | $3 \cdot 10^{10}$ | $5 \cdot 10^{10}$ | $5 \cdot 10^9$ |
| 11 | 3 | 23 | 5 | $5 \cdot 10^{10}$ | $7 \cdot 10^{10}$ | $7 \cdot 10^{10}$ |
| 12 | 3 | 42 | 10 | $3 \cdot 10^{10}$ | $8 \cdot 10^9$ | $1 \cdot 10^{10}$ |
| 13 | 3 | 42 | 5 | $4 \cdot 10^{10}$ | $8 \cdot 10^{10}$ | $7 \cdot 10^{10}$ |
| 14 | 4 | 9 | 10 | $4 \cdot 10^{10}$ | $1 \cdot 10^{11}$ | — |
| 15 | 4 | 23 | 10 | $2 \cdot 10^{10}$ | $2 \cdot 10^{10}$ | $2 \cdot 10^{10}$ |
| 16 | 4 | 23 | 7.5 | $7 \cdot 10^{10}$ | $1 \cdot 10^{11}$ | $8 \cdot 10^{10}$ |
| 17 | 4 | 45 | 10 | $6 \cdot 10^9$ | $5 \cdot 10^9$ | $1 \cdot 10^{10}$ |
| 18 | 4 | 45 | 7.5 | $3 \cdot 10^{10}$ | $5 \cdot 10^{10}$ | $4 \cdot 10^{10}$ |

EXAMPLES 19 to 23

Polyether glycols were reacted with monoisocyanates in proportions of 1 : 2 by adding the isocyanate dropwise with stirring to the polyethylene glycol which had been heated to a temperature of 70° to 80°C and then heating the reaction mixture to 120°C for 6 hours.

The antistatic action of these polyether polyurethanes in threads of polyacrylonitrile is summarised in the following table.

TABLE 2

$$R-NH-\overset{O}{\underset{\|}{C}}-(OCH_2CH_2)_n-O-\overset{O}{\underset{\|}{C}}-HN-R$$

| Examples | R | $\bar{n}$ | Quantity of additive in % by weight | Surface resistance $\Omega$ | | |
|---|---|---|---|---|---|---|
| | | | | fresh fibres | after 10 washes | after dyeing and 5 washings |
| 19 | $CH_3-$ | 45 | 10 | $4 \cdot 10^8$ | $5 \cdot 10^{10}$ | $8 \cdot 10^9$ |
| 20 | $\underset{CH_3}{\overset{CH_3}{>}}CH-$ | 45 | 10 | $3 \cdot 10^8$ | $8 \cdot 10^{10}$ | $1 \cdot 10^{10}$ |
| 21 | $C_{18}H_{37}-$ | 9 | 7.5 | $2 \cdot 10^{10}$ | $1 \cdot 10^{11}$ | $8 \cdot 10^{10}$ |
| 22 | $C_{18}H_{37}-$ | 23 | 7.5 | $3 \cdot 10^9$ | $3 \cdot 10^{10}$ | $2 \cdot 10^{10}$ |
| 23 | $C_{18}H_{37}-$ | 45 | 7.5 | $8 \cdot 10^9$ | $7 \cdot 10^{10}$ | $5 \cdot 10^{10}$ |

What we claim is:

1. A shaped article of an acrylonitrile polymer containing at least 60% by weight of acrylonitrile in copolymerized form containing as an antistatic additiv from 0.5 to 15 % by weight, based on the total mixture, of at least one polyether polyurethane compound of the general formula

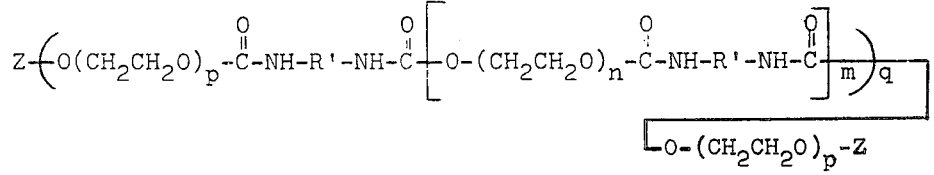

in which

Z represents the radical $$R-NH-\overset{O}{\underset{\|}{C}}-$$

or R, where R denotes a $C_{1-18}$-alkyl, cycloalkyl, aryl, aralkyl or alkaryl radical said radical being substituted by halogen or alkyl or not, R' represents an alkylene, cycloalkylene, arylene, aralkylene or alkarylene radical, said radical being substituted by halogen or alkyl or not, p and n denote integers of from 5 to 50 being identical $$(\text{when } Z = R-NH-\overset{O}{\underset{\|}{C}}-)$$

or different (when Z = R) and m represents an integer of from 0 to 10 when Z denotes the group $$R-NH-\overset{O}{\underset{\|}{C}}-$$

or it represents an integer of from 1 to 10 when Z denotes the group R, and q represents the integer 1 (when Z = R) or an integer of from 0 or 1

$$(\text{when } Z = R-NH-\overset{O}{\underset{\|}{C}}-).$$

2. The shaped article of claim 1, wherein in the general formula said radical R' represents

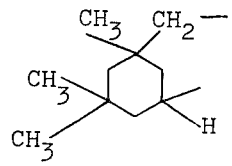

3. The shaped article of claim 1, wherein in the general formula said radical R' represents

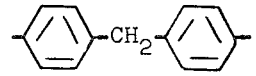

4. The shaped article of claim 1, wherein in the general formula said radical R' represents

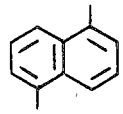

5. The shaped article of claim 1, wherein when said radical Z in the general formula is representing R—NH—CO— said radical R is a long chain aliphatic or a cycloaliphatic radical.

* * * * *

UNITED STATES PATENT OFFICE
CERTIFICATE OF CORRECTION

PATENT NO. : 3,891,718
DATED : June 24, 1975
INVENTOR(S) : Gerhard Dieter Wolf, et al It is certified that error appears in the above-identified patent and that said Letters Patent are hereby corrected as shown below:

In the Abstract, second line, "an" should be ---as---.

Column 1, line 47, "socalled" should be ---so-called---.

Column 2, line 25, before "R" ---where--- should be inserted.

Column 8, line 29, "aa" should be ---a---.

Signed and Sealed this twenty-fourth Day of February 1976

[SEAL]

Attest:

RUTH C. MASON
Attesting Officer

C. MARSHALL DANN
Commissioner of Patents and Trademarks